United States Patent
Brownscheidle et al.

(10) Patent No.: US 11,150,909 B2
(45) Date of Patent: Oct. 19, 2021

(54) ENERGY EFFICIENT SOURCE OPERAND ISSUE

(71) Applicant: International Business Machines Corporation, Armonk, NY (US)

(72) Inventors: Jeffrey C. Brownscheidle, Seattle, WA (US); Sundeep Chadha, Austin, TX (US); Maureen A. Delaney, Richmond, VT (US); Dung Q. Nguyen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 625 days.

(21) Appl. No.: 14/965,957

(22) Filed: Dec. 11, 2015

(65) Prior Publication Data

US 2017/0168830 A1  Jun. 15, 2017

(51) Int. Cl.
*G06F 9/38* (2018.01)
*G06F 9/30* (2018.01)

(52) U.S. Cl.
CPC ........ *G06F 9/3836* (2013.01); *G06F 9/30007* (2013.01); *G06F 9/30072* (2013.01); *G06F 9/3869* (2013.01)

(58) Field of Classification Search
None
See application file for complete search history.

(56) References Cited

U.S. PATENT DOCUMENTS

| 6,054,877 | A | * | 4/2000 | Ventrone | H03K 17/005 326/105 |
|---|---|---|---|---|---|
| 7,631,207 | B1 | | 12/2009 | Song et al. | |
| 8,090,931 | B2 | | 1/2012 | Col et al. | |
| 8,713,335 | B2 | | 4/2014 | Felch et al. | |
| 8,736,619 | B2 | | 5/2014 | Shah et al. | |

(Continued)

FOREIGN PATENT DOCUMENTS

WO    2007057831 A1    5/2007

OTHER PUBLICATIONS

Brooks et al., "Dynamically Exploiting Narrow Width Operands to Improve Processor Power and Performance", IEEE, Fifth International Symposium on High-Performance Computer Architecture, Jan. 9-13, 1999, Orlando, FL, pp. 13-22, DOI: 10.1109/HPCA.1999.744314.

(Continued)

*Primary Examiner* — John M Lindlof
(74) *Attorney, Agent, or Firm* — William E. Schiesser (57) ABSTRACT

In an approach for decreasing a rate of logic voltage level transitions in a multiplexor, one of a plurality of inputs to a multiplexor is selected with a first multiplexor select value at a first clock, wherein each input to the multiplexor is identified as one of i) valid and ii) invalid and the first multiplexor select value is latched in a latch until the first multiplexor select value is replaced by a second multiplexor select value. The second multiplexor select value is determined. The second multiplexor select value is applied to the multiplexor at a second clock if and only if the second multiplexor select value is different from the first multiplexor select value and the second multiplexor select value selects a valid input, wherein the second clock follows the first clock. Subsequent to applying the second multiplexor select value, the second multiplexor value is latched in the latch.

20 Claims, 8 Drawing Sheets

(56) References Cited

U.S. PATENT DOCUMENTS

2003/0043665 A1\* 3/2003 Jacobson .............. G11C 15/04
                                                    365/204
2010/0257340 A1\* 10/2010 Doing ................ G06F 9/30145
                                                    712/215
2012/0278593 A1   11/2012 Clark et al.
2014/0059328 A1    2/2014 Gonion

OTHER PUBLICATIONS

Munch et al., "Automating RT-Level Operand Isolation to Minimize Power Consumption in Datapaths", Design, Automation and Test in Europe Conference and Exhibition, pp. 624-631, Mar. 27-30, 2000, Paris, France, DOI: 10.1145/343647.343873, © ACM 2000.

\* cited by examiner

ENERGY EFFICIENT SOURCE OPERAND ISSUE

BACKGROUND OF THE INVENTION

The present invention relates generally to the field of processor microarchitecture and more particularly to the scheduling and issuing of instructions to execution units in a processor.

A processor often fetches instructions from an instruction cache into a dispatch unit, which identifies their types and transfers them to an appropriate reservation station within an issue queue. Often an instruction remains in a reservation station until all its source operands are available (i.e., until it is ready to be executed), after which the instruction and its source operands are issued to an execution unit for execution. It is often advantageous to issue an instruction that has been in the issue queue for the longest time (i.e., the oldest instruction in the queue), out of all instructions in the queue that are ready to execute. It is more likely that other instructions are waiting for the data produced by the oldest instruction than for data produced by a younger instruction in the issue queue.

In many computer architectures an instruction may source up to two and sometimes up to three operands. Therefore, an instruction issued from an issue queue to an execution unit may be accompanied by zero, one, two, or three operands. In an architecture that includes an instruction that can source three operands, there are three logic paths (one for each possible operand) from a reservation station (for that instruction type) to an execution unit that can execute the instruction. The logic in the issue queue is often a critical path in the logic in the processor, i.e., the cycle time of the processor (and, in some scenarios, its performance) may depend on the speed of the issue queue. Therefore, issue queue logic is usually optimized for speed and consequently can consume significant amounts of energy during its operation. Techniques that can decrease the energy consumed by issue queue logic while maintaining its speed are highly valued and are an active area of research.

SUMMARY

Aspects of an embodiment of the present invention disclose a method, program product, and system for an approach for decreasing a rate of logic voltage level transitions in a multiplexor. The method includes selecting, by one or more processors, one of a plurality of inputs to a multiplexor with a first multiplexor select value at a first clock, wherein each input to the multiplexor is identified as one of i) valid and ii) invalid and the first multiplexor select value is latched in a latch until the first multiplexor select value is replaced by a second multiplexor select value. The method further includes determining, by one or more processors, the second multiplexor select value. The method further includes applying, by one or more processors, the second multiplexor select value to the multiplexor at a second clock if and only if the second multiplexor select value is different from the first multiplexor select value and the second multiplexor select value selects a valid input, wherein the second clock occurs after the first clock. The method further includes, subsequent to applying the second multiplexor select value, latching, by one or more processors, the second multiplexor value in the latch.

DETAILED DESCRIPTION

Detailed embodiments of the present invention are disclosed herein with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the present invention recognize that the performance of a processor is often dependent in part on a fast, efficient issue queue and that speed and logic path balance (i.e., various paths through a logic have similar delays) in logic is often obtained with parallelism. In some embodiments, the level of efficiency of an issue queue is determined based on one or more of: a) energy consumption, b) speed, and c) cooling requirements.

Figure 1:
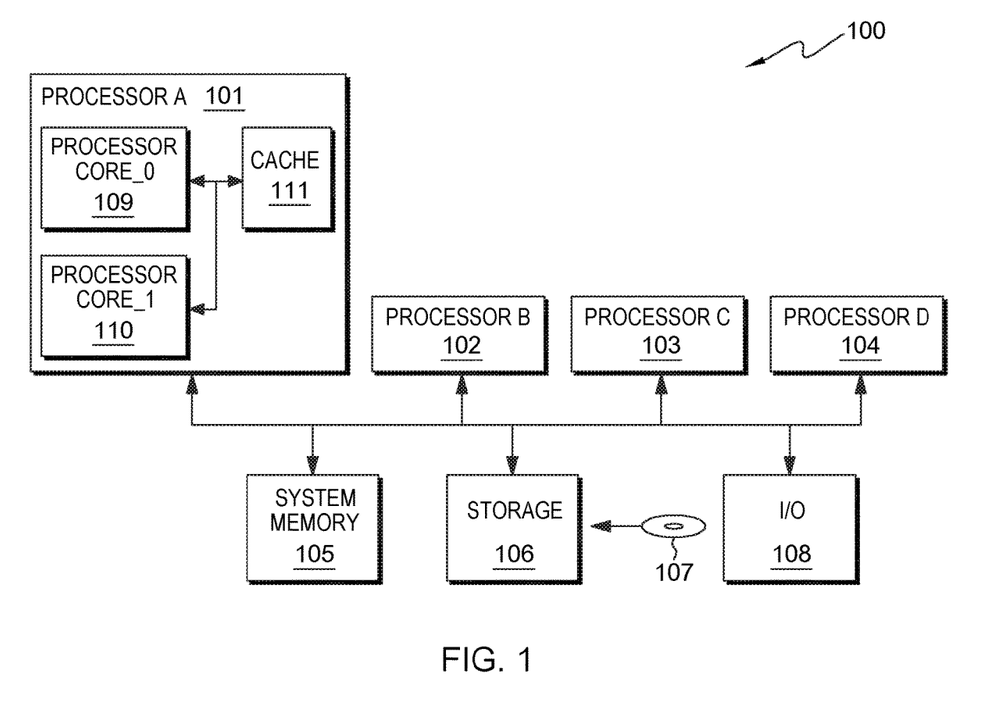
FIG. 1 depicts a block diagram of a multiprocessor computing system, in accordance with an embodiment of the present invention.

FIG. 1 depicts multiprocessor computer 100 that, in some scenarios and embodiments, contains processor A 101, processor B 102, processor C 103, processor D 104, system memory 105, storage 106, hard disk 107, and I/O 108. Processor A 101 is a multicore processor that contains processor core_0 109, processor core_1 110, and L2 cache 111. The internal structures of processor B 102, processor C 103, and processor D 104 are essentially similar to that of processor A 101. In some scenarios and embodiments, processor A 101, processor B 102, processor C 103, and processor D 104 compute separate independent jobs or cooperatively compute independent pieces of one or more jobs in parallel.

Figure 2:
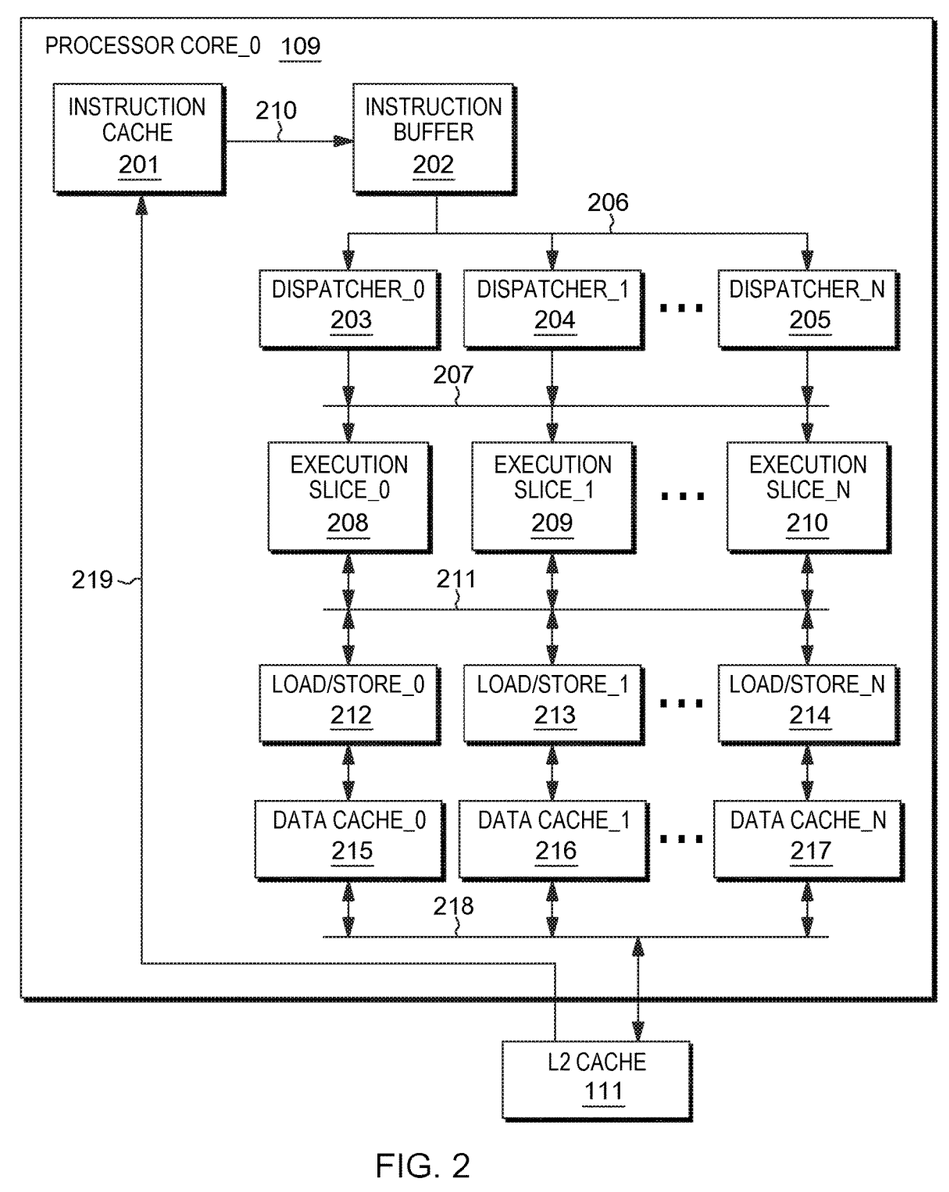
FIG. 2 depicts a block diagram of processor core_0 that is depicted in FIG. 1, in accordance with an embodiment of the present invention.

FIG. 2 depicts processor core_0 109 in more detail. In some scenarios and embodiments, processor core_0 109 contains instruction buffer 202, instruction buffer bus 206, dispatcher_0 203, and n other dispatchers (dispatcher_1 204 through dispatcher_N 205). Processor core_0 109 also contains dispatcher bus 207, execution slice_0 208, and n other execution slices, execution slice_1 209 through execution slice_N 210. Processor core_0 109 also contains execution slice bus 211, load/store_0 212, and n other load/store units (load/store_1 213 through load/store_N 214). Processor core_0 also contains data cache_0 215, and n other data caches (data cache_1 216 through data cache_N 217). Processor core_0 also contains data cache bus 218, instruction cache bus 219, and instruction cache 201. In an embodiment, instruction buffer 202 fetches instructions from instruction cache 201 for execution in processor core 109. Instruction cache 201 fetches instructions from L2 cache 111 when an access by instruction buffer 202 misses in instruction cache 201.

In some scenarios and embodiments, instruction buffer 202 forwards instructions to dispatcher_0 203, and n other dispatchers, dispatcher_1 204 through dispatcher_N 205, over instruction buffer bus 206. Dispatcher_0 203, and n other dispatchers (dispatcher_1 204 through dispatcher_N 205), route instructions to execution slice_0 208, and n other execution slices (execution slice_1 209 through execution slice_N 210), over dispatcher bus 207. The instructions routed over dispatcher bus 207 are executed in the execution slices. In some scenarios and embodiments, during their execution, the instructions store and read data from memory, which is stored and fetched by load/store_0 212, and n other load/store units (load/store_1 213 through load/store_N 214). Load/store_0 212, and the n other load/store units (i.e., load/store_1 213 through load/store_N 214), are connected in one-to-one correspondence to data cache_0 215, and n other data caches (data cache_1 216 through data cache_N 217). For example, load/store_0 212 stores data to and reads data from data cache_0 215, and load/store_1 213 stores data to and reads data from data cache_1 216. When data is requested by an execution slice and a miss occurs in the corresponding data cache, L2 cache 111 is accessed over data cache bus 218.

Figure 3:
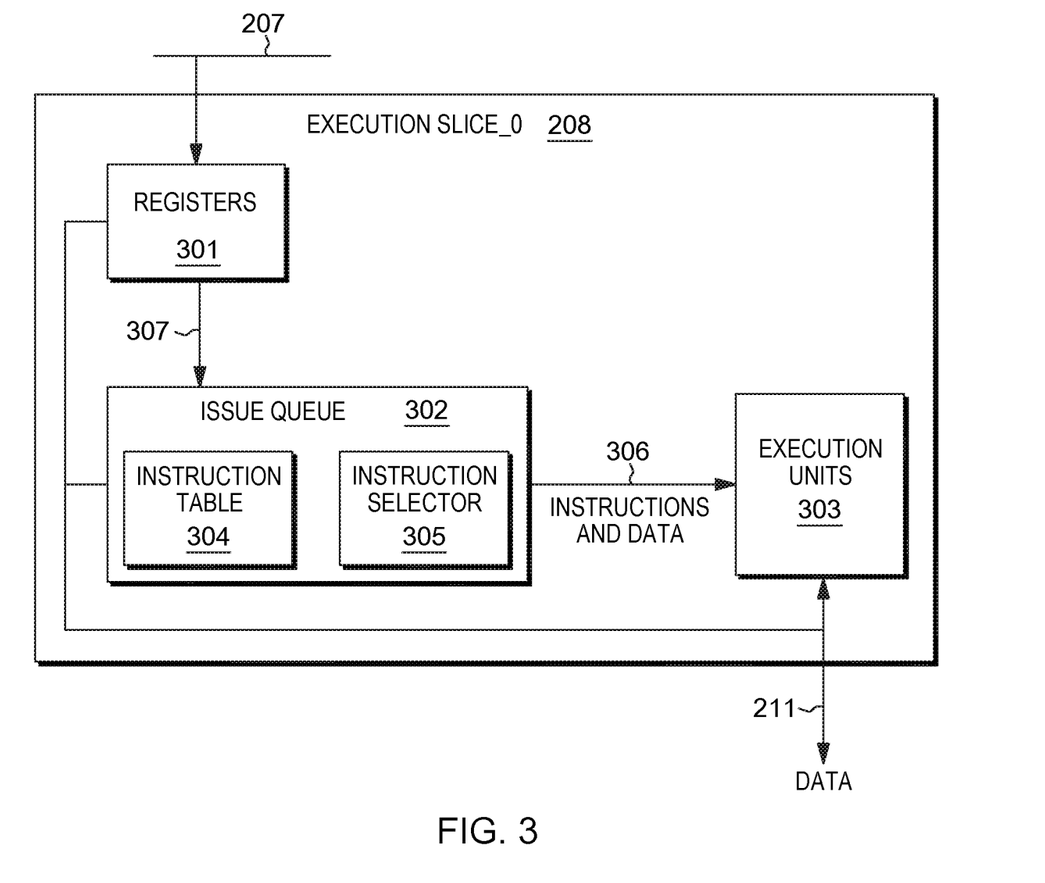
FIG. 3 depicts a block diagram of execution slice_0 that is depicted in FIG. 2, in accordance with an embodiment of the present invention.

FIG. 3 depicts execution slice_0 208 in more detail. The internal structures of execution slices execution slice_1 209 through execution slice_N 210 are essentially similar to that of execution slice_0 208. In an embodiment, execution slice_0 208 contains registers 301, issue queue 302, and execution units 303. Issue queue 302 contains instruction table 304 and instruction selector 305. In some scenarios and embodiments, registers 301 receive instructions from dispatcher_0 203 and n other dispatchers (dispatcher_1 204 through dispatcher_N 205), over dispatcher bus 207. Registers 301 provides operand source data to the instructions when registers 301 has the data and maps the source of operands in the instructions to other operand sources when operands are not currently available in registers 301. Registers 301 forwards the instructions that it receives over register bus 307 to instruction table 304 in issue queue 302.

In an embodiment, instruction table 304 determines which instructions that it holds are ready for execution. In an embodiment, instruction table 304 contains up to 8 instructions (instruction 0, instruction 1, instruction 2, instruction 3, instruction 4, instruction 5, instruction 6, and instruction 7), but one skilled in the art knows that instruction table 304 can be constructed to contain any number of instructions. An instruction is ready for execution when the instruction has access to all the source operands that the instruction requires to execute (i.e., all data that are inputs to the instruction). Instruction table 304 informs instruction selector 305 as to which instructions in the 8 instructions that it can contain are ready to execute by asserting a value of TRUE on one or more of the 8 bits that comprise a ready bus. Instruction selector 305 selects the oldest ready instruction in instruction table 304 (i.e., the instruction that is ready for execution and has been in instruction table 304 for the longest time relative to other ready instructions) and sends the instruction to execution units 303 for execution. Execution units 303 executes an instruction that is received from issue queue 302 and places data that is the result of the execution of the instruction on execution slice bus 211. When instruction selector 305 selects the oldest ready instruction in instruction table 304, instruction selector 305 selects the source operands of the instruction, on which the instruction operates. The source operands accompany the instruction to execution units 303. In an embodiment, an instruction can have up to three source operands.

In some scenarios and embodiments, instruction selector 305 tracks the relative ages of all the instructions in instruction table 304 with two separate source operand selection logics that operate concurrently, a first logic and a second logic. In an embodiment, the first logic tracks the relative ages of two instructions in each of up to four pairs of instructions in instruction table 304. That is, in each of the four pairs of instructions, one instruction is selected as the oldest ready instruction, so the source operands of four candidate instructions are selected by the first logic. In an embodiment, the second tracking logic tracks the relative ages of all instructions in instruction table 304 and selects the source operands from the oldest candidate instruction from the up to four candidate instructions that are selected by the first tracking logic. Embodiments of the present invention recognize that performing two source operand selections concurrently (with the first tracking logic and the second tracking logic) decreases the time required to select and route the source operands of an oldest ready instruction in instruction table 304 to execution units 203.

Figure 4:
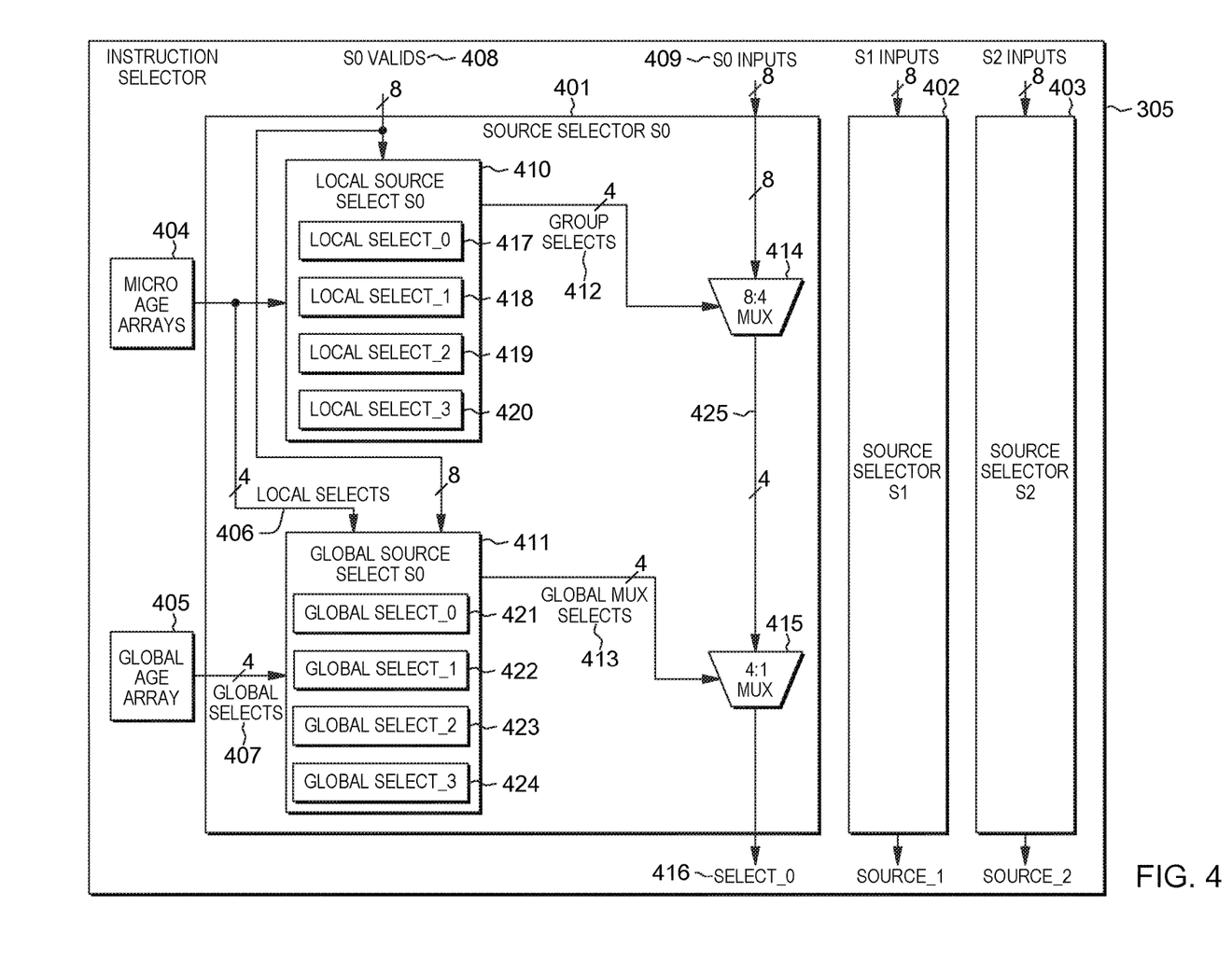
FIG. 4 depicts a detail of the instruction selector that is depicted in FIG. 3, in accordance with an embodiment of the present invention.

FIG. 4 depicts the parts of instruction selector 305 that select the source operands for an instruction. In some scenarios and embodiments, instruction selector 305 contains global age array 405 and micro age arrays 404. Global age array 405 and micro age arrays 404 in instruction selector 305 track the age of instructions in instruction table 304 and select the oldest ready instruction in instruction table 304. In an embodiment, global age array 405 tracks the relative ages of all the instructions in instruction table 304, and micro age arrays 404 tracks the relative ages of instructions in 4 pairs of entries in instruction table 304 (instruction pair 0, instruction pair 1, instruction pair 2, and instruction pair 3). In an embodiment, instruction 0 and instruction 1 are in instruction pair 0, instruction 2 and instruction 3 are in instruction pair 1, instruction 4 and instruction 5 are in instruction pair 2, and instruction 6 and instruction 7 are in instruction pair 3. In an embodiment, instruction table 304 contains eight entries and each entry are configured to contain up to one instruction. Therefore, global age array 405 tracks the relative age of up to eight instructions in instruction table 304 and micro age arrays 404 tracks the relative age of up to two instructions in each of four pairs of entries in instruction table 304. One skilled in the art knows that the relative age of any number of instructions can be tracked in like manner.

In some scenarios and embodiments, instruction table 304 determines which of the instructions that it contains are ready for execution, i.e., it identifies those instructions that currently have access to valid source operands. In some scenarios and embodiments, every instruction in instruction table 304 is configured to have up to three source operands (designated S0, S1, and S2). In an embodiment, source selector S0 401 selects the source operand associated with S0 in the oldest ready instruction in instruction table 304. Similarly, source selector S1 402 and source selector S2 403 select the source operands associated with S1 and S2, respectively, in the oldest ready instruction in instruction table 304. In an embodiment, the structure and operation of source selector S1 402 and source selector S2 403 are substantially similar to the structure and operation of source selector S0 401.

In some scenarios and embodiments, an instruction is configured to have zero, one, two, or three source operands. Source operands that an instruction does not use are designated as invalid. In an embodiment, instruction table 304 represents the valid state of S0 in an instruction in instruction table 304 with a bit associated with the instruction, on S0 valids bus 408. In an embodiment, a bit associated with an instruction with a value of TRUE on S0 valids bus 408 signals that S0 in the associated instruction in instruction table 304 is valid. In some scenarios and embodiments, multiple S0 operands in instruction table 304 are ready at any given time (one for each instruction in instruction table 304). Therefore, in some scenarios and embodiments, instruction table 304 is configured to assert multiple TRUE bits simultaneously (up to 8 bits, one bit for each instruction that it can contain) on S0 valids bus 408. Instruction table 304 asserts the values of the S0 operands that it contains on S0 inputs bus 409.

Local source select S0 410 receives an input from micro age arrays 404 on local selects bus 406. Micro age arrays 404 tracks the relative ages of instructions in pairs of entries in instruction table 304. There is a bit on local selects bus 406 associated with each of the four pairs of instructions contained in micro age arrays 404$n$ an embodiment, local source select S0 uses the information provided on S0 valids bus 408 and local selects bus 406 to generate a select on group selects bus 412 (that selects between a pair of S0 operands). Group selects bus 412 controls the output of 8:4 mux 414 which is one of a pair of S0 operands that is selected by local source select S0 410. In an embodiment, local source select S0 410 includes local select_0 417, local select_1 418, local select_2 419, and local select_3 420. In an embodiment, group selects bus 412 is 4-bits wide with 1-bit generated by each of the local select circuits: local select_0 417, local select_1 418, local select_2 419, and local select_3 420.

Embodiments of the present invention recognize that the amount of energy being used is reduced by eliminating unnecessary changes in the value of the bits on group selects bus 412. A change in the value of the bits on group selects bus 412 changes the input to 8:4 mux 414 (from S0 inputs bus 409) that is selected for output on bus 425. This change to the output of 8:4 mux 414 consumes energy. Local select_0 417, local select_1 418, local select_2 419, and local select_3 420 at least reduce, and in some cases eliminate, unnecessary changes in the value of the bits on group selects bus 412 (i.e., the bits that select inputs to 8:4 mux 414 for output on bus 425), thereby decreasing energy consumption and associated cooling requirements. An unnecessary change is a change that selects an invalid input. The invalid input would be selected (consuming energy) but would not be used because it is not valid. Another unnecessary change is caused by generating a new select that is the same as the previous select. While the value of the bits on group selects bus 412 would be the same after two selections that are the same, the value of the bits on group selects bus 412 can assume indeterminate values during the time between the two selections. The indeterminate values on group selects bus 412 would cause 8:4 mux 414 to make unnecessary selections (consuming energy) during this time. The structure and operation of local select_1 418, local select_2 419, and local select_3 420 are substantially similar to that of local select_0 417.

Global source select S0 411 receives inputs on local selects bus 406, S0 valids bus 408, and global selects bus 407. Global source select S0 411 controls 4:1 mux 415 via global mux selects bus 413. In an embodiment, global mux selects bus 413 is a 1-hot bus (i.e., up to one bit on global mux selects bus 413 can be TRUE at any one time). A TRUE bit on (4-bit wide) global mux selects bus 413 causes 4:1 mux 415 to select one of the four S0 source operands on bus 425 and to output the selected S0 source operand on source_0 bus 416. Global source select S0 411 includes global select_0 421, global select_1 422, global select_2 423, and global select_3 424. In an embodiment, global mux selects bus 413 is 4-bits wide with 1-bit generated by each of the global select circuits: global select_0 421, global select_1 422, global select_2 423, and global select_3 424.

Embodiments of the present invention recognize that energy can be save by eliminating unnecessary changes in the value of the bits on global mux selects bus 413. A change in the value of the bits on global mux selects bus 413 causes a different input to 4:1 mux 415 (from bus 425) to be selected for output on source_0 bus 416 which consumes energy. Global select_0 421, global select_1 422, global select_2 423, and global select_3 424 eliminate unnecessary changes to the value of the bits on global mux selects bus 413 (i.e., the bits that select inputs to 4:1 mux 415 for output on source_0 bus 416), thereby decreasing energy consumption and associated cooling requirements. An unnecessary change is a change that selects an invalid input. The invalid input would be selected (consuming energy) but would not be used because it is not valid. Another unnecessary change is caused by generating a new select that is the same as the previous select. While the value of the bits on global mux selects bus 413 would be the same after two selections that are the same, the value of the bits on global mux selects bus 413 can assume indeterminate values during the time between the two selections. The indeterminate values on global mux selects bus 413 would cause 4:1 mux 415 to unnecessary make selections (consuming energy) during this time. The structure and operation of global select_1 422, global select_2 423, and global select_3 424 are substantially similar to that of global select_0 412.

Figure 5:
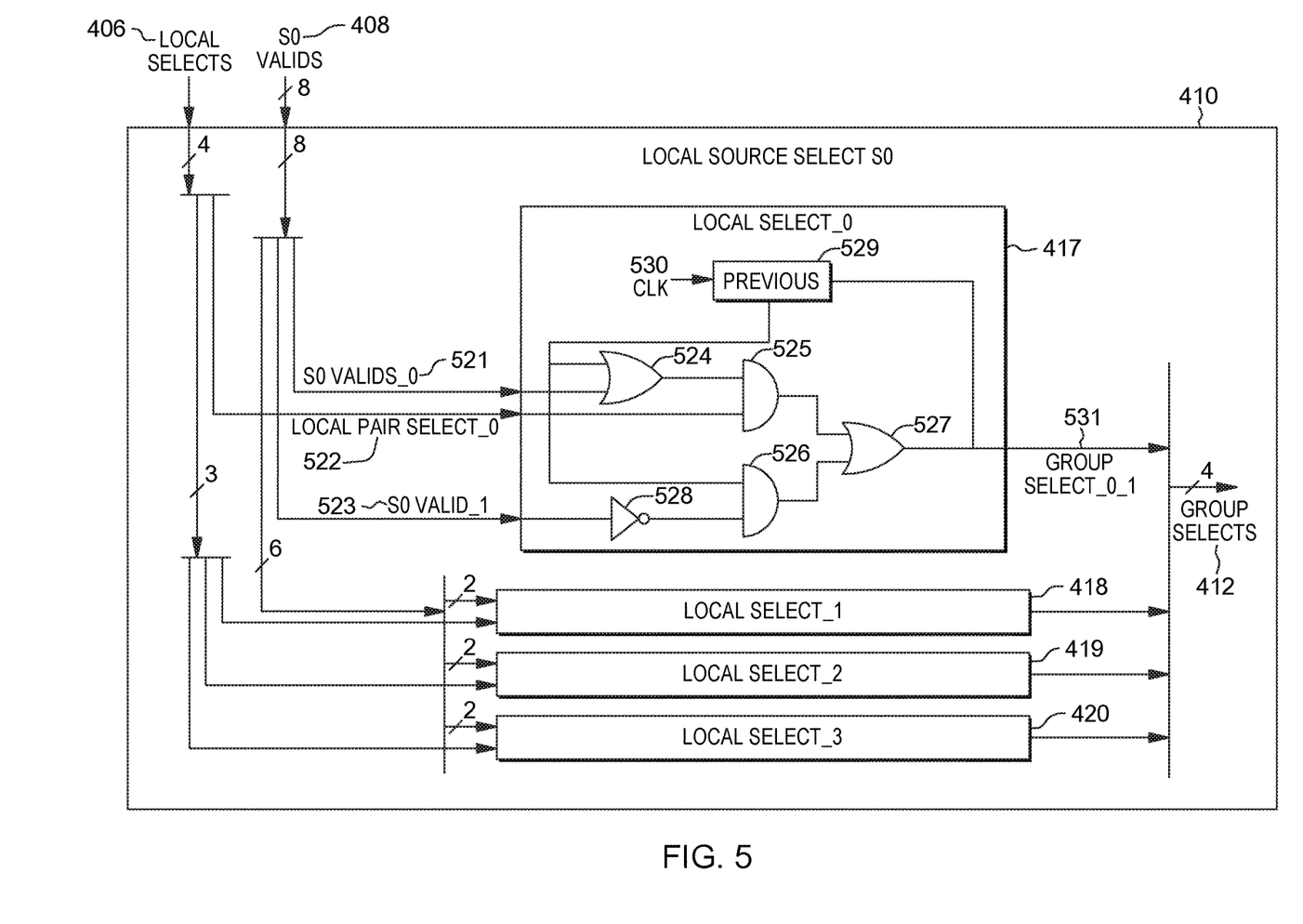
FIG. 5 depicts a detail of local source select S0 that is depicted in FIG. 4 in accordance with an embodiment of the present invention.

FIG. 5 shows the details of local select_0 417. Local select_0 417 receives inputs S0 valid_0 521 and S0 valid_1 523 from S0 valids bus 408. A TRUE on S0 valid_0 521 indicates that the S0 source operand for instruction 0 in instruction table 304 is valid and a TRUE on S0 valid_1 521 indicates that the S0 source operand for instruction 1 in instruction table 304 is valid. Local select_0 417 also receives local pair select_0 522 from local selects bus 406. In an embodiment, a TRUE on local pair select_0 522 indicates that micro age arrays 404 has determined that instruction 0 in instruction pair 0 is the older of the two instructions (instruction 0 and instruction 1) in instruction pair 0. Group select_0_1 531 is the output of local select_0 417 which is one of the four bits that comprise group selects bus 412. The remaining three bits on group selects bus 412 are generated by local select_1 418, local select_2 419 and local select_3 420. A TRUE on group select_0_1 indicates that instruction 0 in instruction pair 0 is the older ready instruction of the two instructions (instruction 0 and instruction 1) in instruction pair 0 and a FALSE on group select_0_1 indicates that instruction 1 in instruction pair 0 is the older ready instruction of the two instructions (instruction 0 and instruction 1) in instruction pair 0.

In an embodiment, local select_0 417 eliminates unnecessary changes in the value of the bit that is group select_0_1 531. Local select_0 417 latches the last value on group select_0_1 531 in the latch previous 529 with clock 530. The logic comprising previous 529, OR gate 524, AND gate 525, AND gate 526, OR gate 527, and INVERTER 528 prevent the logic level on group select_0_1 531 from changing from its previous value that is latched in previous 529 if i) an invalid S0 operand would be selected, or ii) is a new value is the same as the value latched in previous 529.

In one example scenario, in an embodiment, if the previous value on group select_0_1 531 was TRUE (indicating that instruction 0 in instruction pair 0 was selected on the previous cycle), TRUE is latched in previous 529. If on the next clock, S0 valid_0 521 indicates that the S0 source operand for instruction 0 is invalid (with a FALSE value) and S0 valid_1 523 indicates that the S0 source operand for instruction 1 is invalid (with a FALSE value), AND gate 526 receives a TRUE from previous 529 and a TRUE on the output of INVERTER 528, which generates a TRUE on the input to OR 527 and a TRUE on group select_0_1 531. A TRUE on group select_0_1 531 is generated regardless of the value on local pair select_0 522 (which indicates which instruction in instruction pair 0 is the older instruction). The value (TRUE) on group select_0_1 531 does not change and consume energy because the S0 operand in both instructions in instruction pair 0 are invalid. Therefore, the output from local select_0 417 does not change from its previous value if a different instruction in instruction pair 0 becomes the oldest and that oldest instruction does not have a valid S0 operand.

In another example scenario, in an embodiment, if the previous value on group select_0_1 531 was TRUE (indicating that instruction 0 in instruction pair 0 was selected on the previous cycle), TRUE is latched in previous 529. If on the next clock S0 valid_0 521 indicates that the S0 source operand for instruction 0 is invalid (with a FALSE value), S0 valid_1 523 indicates that the S0 source operand for instruction 1 is valid (with a FALSE value), and local pair select_0 522 is FALSE, the output from AND 525 is FALSE and the output from AND 526 is FALSE. Then the output from OR 527 is FALSE, indicating that the S0 source operand for instruction 1 is valid. Therefore, the output from local select_0 417 changes from its previous value if a different instruction in instruction pair 0 becomes the oldest and that oldest instruction has a valid S0 operand.

Figure 6:
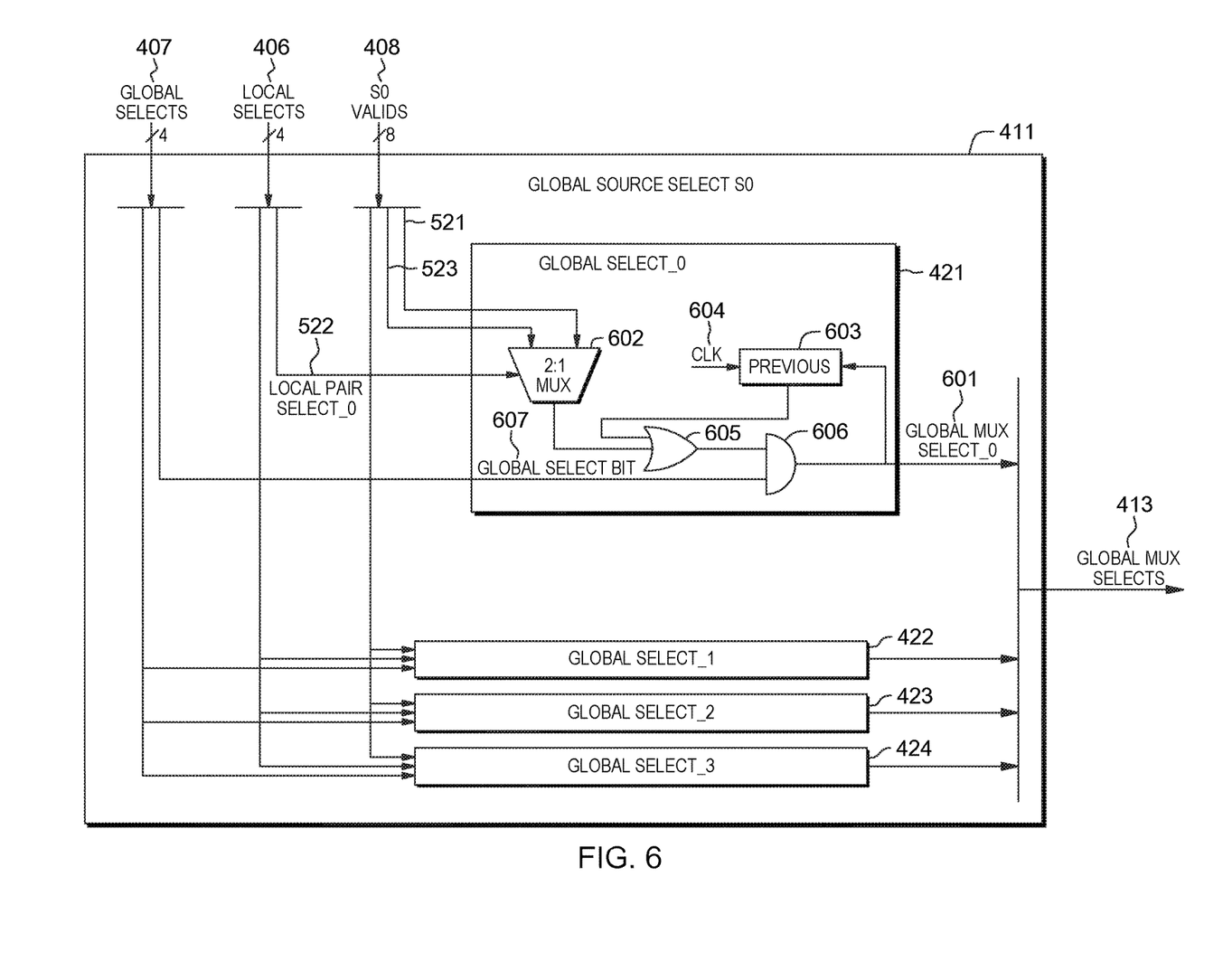
FIG. 6 depicts a detail of global source select S0 that is depicted in FIG. 4 in accordance with an embodiment of the present invention.

FIG. 6 shows the details of global select_0. Global select 421 receives S0 valid_0 521 (from instruction table 304 via S0 valids bus 408), S0 valid_1 423 (from instruction table 304 via S0 valids bus 408), and local pair select_0 522 (from micro age arrays 404), and generates a 1-bit output, global mux select_0 601 that is one of four bits that comprise 4-bit bus global mux selects 413. The remaining three bits on bus global mux selects 413 are generated by global select_1 422, global select_2 423, and global select_3 424. Global mux selects 413 controls 4:1 mux 415, and causes 4:1 mux 415 to select S0 operand from the oldest ready instruction in instruction table 304. 8:4 mux 414 (controlled by local source select S0 410 via group selects bus 412) first selects the S0 operand from the oldest ready instruction in each of 4 pairs of instructions if the S0 operand is valid, then, from those four instructions (the oldest instruction in each pair of instructions), 4:1 mux 415 selects the S0 operand from the overall oldest ready instruction if the S0 operand is valid. Global select_0 421 also receives global select bit 607 from global selects 407. Global select bit 607 is TRUE when instruction pair 0 contains the oldest ready instruction in instruction table 304.

Local pair select_0 522 causes 2:1 mux 602 to select one of two S0 valid bits (one from each of two instructions in instruction pair 0). If an instruction in instruction pair 0 is the oldest ready instruction in instruction table 304 and if the S0 operand of that instruction is valid, the output of global select_0 421 will cause that valid S0 operand to be selected by 4:1 mux 415.

In an embodiment, global select_0 421 eliminates unnecessary changes to the value of the bit that is global mux select_0 601 (i.e., a select change). An unnecessary select change is a change that selects an invalid source operand. The invalid source operand would be selected (consuming energy) but would not be used because it is not valid. Another unnecessary select change is caused by generating a new value on global mux select_0 601 that is the same as the previous value on global mux select_0 601. The values of the current and previous selects would be the same but would float during the period between the selects, causing energy consuming logic level transitions.

In one example scenario, in an embodiment, if the previous value on global mux select_0 601 was TRUE (indicating that an instruction from instruction pair 0 was selected from instruction table 304 in the previous cycle), TRUE is latched in previous 603. Therefore, the input to OR 605 is TRUE and the output of OR 605 is true. If global select bit 607 from global selects 407 is TRUE (indicating that an instruction in instruction pair 0 is the oldest ready instruction in instruction table 304) and the S0 operand of the oldest instruction in instruction pair 0 is valid, the output of global select_0 remains TRUE (indicating that the oldest ready instruction is in instruction pair 0), and there is no energy consuming logic value transition on global mux select_0 601.

In another example scenario, in an embodiment, if the previous value on global mux select_0 601 was TRUE (indicating that an instruction from instruction pair 0 was selected from instruction table 304 in the previous cycle), TRUE is latched in previous 603. If global select bit 607 from global selects 407 is FALSE (indicating that neither instruction in instruction pair 0 is the oldest ready instruction in instruction table 304), then AND gate 606 receives a FALSE on its input and global mux select_0 601 becomes FALSE, and stays FALSE as long as the global select bit from global selects 407 remains FALSE.

Figure 7:
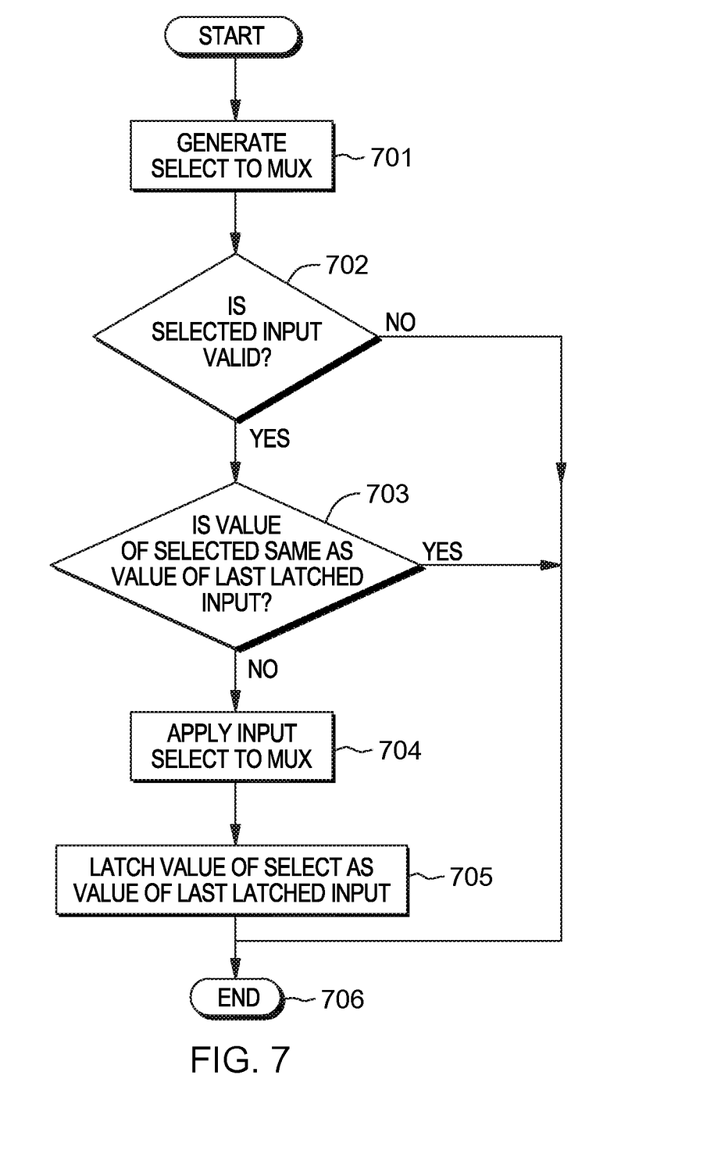
FIG. 7 is a flow chart that depicts the operation of local source select S0 that is depicted in FIG. 5 and global source select S0 that is depicted in FIG. 6, in accordance with an embodiment of the present invention.

FIG. 7 is a flow chart that depicts the major operations performed in an embodiment of the present invention to reduce transitions on the output of a multiplexor (e.g., 8:4 mux 414 or 4:1 mux 415) by reducing changes to the select input to the multiplexor. In an embodiment, these major operations are performed by local select_0 417 on output group select_0_1 531 (a select input to 8:4 mux 414) and by global select_0 421 on output global mux select_0 601 (a select input to 4:1 mux 415). In an embodiment, an input select is generated to the multiplexor (step 701). The validity of the selected input to the multiplexor is determined (decision step 702). In an embodiment, the validity of the selected input to the multiplexor is provided by instruction table 304 via S0 valids bus 408. If the selected input to the multiplexor is valid (decision step 702, YES branch), a determination is made as to whether the value of the select input has the same value as the last latched select input (decision step 703). In an embodiment, the value of the last latched select input is provided by previous latch 429 in local select_0 417 and by previous latch 603 in global select_0 421. If the value of the select input does not have the same value as the last select input (decision step 703, NO branch) the input select is applied to the multiplexor (step 704). Then the value of the selected input is latched as the value of the last latched input (step 705) and the process ends (step 706).

If the selected input to the multiplexor is not valid (decision step 702, No branch), the select input to the multiplexor remains the same and the process ends (step 706). If the value of the select input has the same value as the last select input (decision step 703, YES branch), the select input to the multiplexor remains the same and the process ends (step 706).

Figure 8:
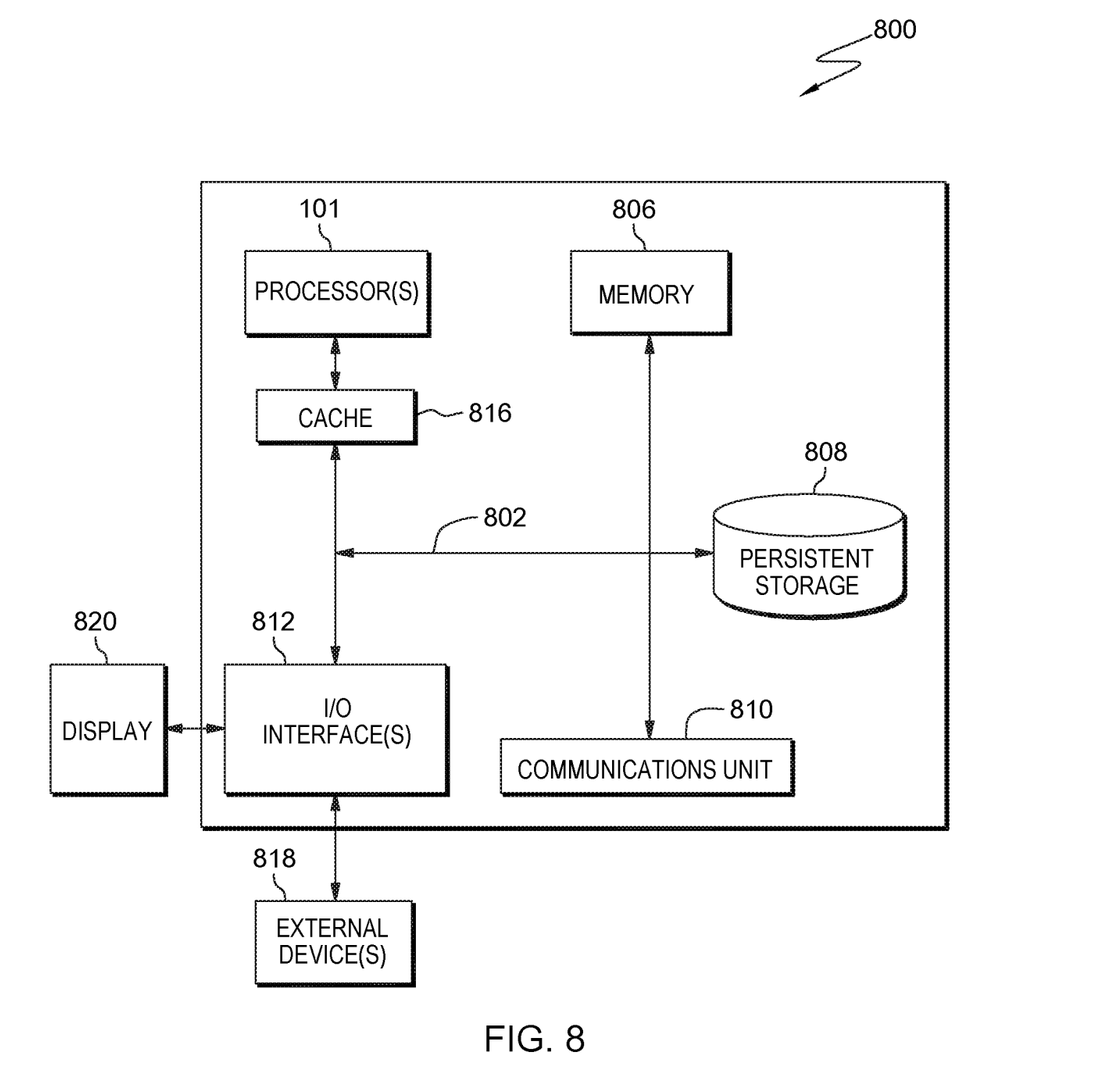
FIG. 8 depicts a block diagram of a computer system that incorporates the processor depicted in FIG. 1, in accordance with an embodiment of the present invention.

FIG. 8 depicts computer system 800 that is an example computer system that incorporates processor 101, a component of multiprocessor computer 100 that includes processor core_0 109, processor core_1 110, and cache 111. Computer system 800 includes communications fabric 802, which provides communications between computer processor 101, memory 806, persistent storage 808, communications unit 810, and input/output (110) interface(s) 812. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses.

Memory 806 and persistent storage 808 are computer readable storage media. In this embodiment, memory 806 includes random access memory. In general, memory 806 can include any suitable volatile or non-volatile computer readable storage media. Cache 816 is a fast memory that enhances the performance of processors 101 by holding recently accessed data and data near accessed data from memory 806.

Program instructions and data used to practice embodiments of the present invention may be stored in persistent storage 808 for execution by one or more of the respective processors 804 via cache 816 and one or more memories of memory 806. In an embodiment, persistent storage 808 includes a magnetic hard disk drive. Alternatively, or in addition to a magnetic hard disk drive, persistent storage 808 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of persistent storage 808.

Communications unit 810, in these examples, provides for communications with other data processing systems or devices. In these examples, communications unit 810 includes one or more network interface cards. Communications unit 810 may provide communications through the use of either or both physical and wireless communications links. Program instructions and data used to practice embodiments of the present invention may be downloaded to persistent storage 808 through communications unit 810.

I/O interface(s) 812 allows for input and output of data with other devices that may be connected to each computer system. For example, I/O interface 812 may provide a connection to external devices 818 such as a keyboard, keypad, a touch screen, and/or some other suitable input device. External devices 818 can also include portable computer readable storage media such as, for example, thumb drives, portable optical or magnetic disks, and memory cards. Software and data used to practice embodiments of the present invention can be stored on such portable computer readable storage media and can be loaded onto persistent storage 808 via I/O interface(s) 812. I/O interface(s) 812 also connect to a display 820.

Display 820 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

Each respective figure, in addition to illustrating methods of and functionality of the present invention at various stages, also illustrates the logic of the method as implemented, in whole or in part, by one or more devices and structures. Such devices and structures are configured to (i.e., include one or more components, such as resistors, capacitors, transistors and the like that are connected to enable the performing of a process) implement the method of merging one or more non-transactional stores and one or more thread-specific transactional stores into one or more cache line templates in a store buffer in a store cache. In other words, one or more computer hardware devices can be created that are configured to implement the method and processes described herein with reference to the Figures and their corresponding descriptions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable other of ordinary skill in the art to understand the embodiments disclosed herein.

Embodiments of the present invention may be used in a variety of electronic applications, including but not limited to advanced sensors, memory/data storage, semiconductors, microprocessors and other applications.

A resulting device and structure, such as an integrated circuit (IC) chip can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may be included by only some of the described embodiments. Accordingly, the invention is not to be seen as limited by the foregoing description. A reference to an element in the singular is not intended to mean "one and only one" unless specifically stated, but rather "one or more." All structural and functional equivalents to the elements of the various embodiments described throughout this disclosure that are known or later come to be known to those of ordinary skill in the art are expressly incorporated herein by reference and intended to be encompassed by the invention. It is therefore to be understood that changes may be made in the particular embodiments disclosed which are within the scope of the present invention as outlined by the appended claims.

What is claimed is:

1. A method for decreasing a rate of logic voltage level transitions in a multiplexor, the method comprising:
    selecting, by one or more processors, one of a plurality of inputs to a multiplexor with a first multiplexor select value at a first clock, wherein each input to the multiplexor is identified as one of i) valid and ii) invalid and the first multiplexor select value is latched in a latch until the first multiplexor select value is replaced by a second multiplexor select value;
    determining, by one or more processors, the second multiplexor select value;
    comparing, by one or more processors, the second multiplexor select value and the first multiplexor select value;
    in response to the second multiplexor select value being the same as the first multiplexor select value, maintaining, by one or more processors, the first multiplexor select value at a second clock, wherein (i) the multiplexor does not change the selection from the plurality of inputs and (ii) the second clock occurs after the first clock;
    in response to (a) the second multiplexor select value is different from the first multiplexor select value and (b) the second multiplexor select value selects a valid input, applying, by one or more processors, the second multiplexor select value to the multiplexor at the second clock, wherein the second clock occurs after the first clock; and
    subsequent to applying the second multiplexor select value, latching, by one or more processors, the second multiplexor value in the latch.

2. The method of claim 1, wherein the multiplexor is a part of an instruction issue unit in a processor.

3. The method of claim 2, wherein the plurality of inputs to the multiplexer are instruction source operands.

4. The method of claim 2, wherein the instruction issue unit can select one of up to eight instructions to issue.

5. The method of claim 4, wherein an instruction can have up to three source operands.

6. The method of claim 5, wherein the instruction table identifies one or more entries in the instruction table that each contain an instruction that is ready to execute.

7. The method of claim 6, wherein an instruction is ready to execute if the instruction is the oldest instruction in the instruction table and the source operands of the instruction are valid.

8. A computer program product for selecting and issuing an oldest ready instruction in an issue queue, the computer program product comprising:
    one or more computer readable storage media and program instructions stored on the one or more computer readable storage media, the program instructions comprising:
    program instructions to select one of a plurality of inputs to a multiplexor with a first multiplexor select value at a first clock, wherein each input to the multiplexor is identified as one of i) valid and ii) invalid and the first multiplexor select value is latched in a latch until the first multiplexor select value is replaced by a second multiplexor select value;
    program instructions to determine the second multiplexor select value;
    program instructions to compare the second multiplexor select value and the first multiplexor select value;
    in response to the second multiplexor select value being the same as the first multiplexor select value, program instructions to maintain the first multiplexor select value at a second clock, wherein (i) the multiplexor does not change the selection from the plurality of inputs and (ii) the second clock occurs after the first clock;

in response to (a) the second multiplexor select value is different from the first multiplexor select value and (b) the second multiplexor select value selects a valid input, program instructions to apply the second multiplexor select value to the multiplexor at the second clock, wherein the second clock occurs after the first clock; and program instructions to, subsequent to applying the second multiplexor select value, latch the second multiplexor value in the latch.

9. The computer program product of claim 8, wherein the multiplexor is a part of an instruction issue unit in a processor.

10. The computer program product of claim 9, wherein the plurality of inputs to the multiplexor are instruction source operands.

11. The computer program product of claim 9, wherein the instruction issue unit can select one of up to eight instructions to issue.

12. The computer program product of claim 11, wherein an instruction can have up to three source operands.

13. The computer program product of claim 12, wherein the instruction table identifies one or more entries in the instruction table that each contain an instruction that is ready to execute.

14. The computer program product of claim 13, wherein an instruction is ready to execute if the instruction is the oldest instruction in the instruction table and the source operands of the instruction are valid.

15. A computer system product for selecting and issuing an oldest ready instruction in an issue queue, the computer program product comprising:

one or more computer processors, one or more computer readable storage media, and program instructions stored on the computer readable storage media for execution by at least one of the one or more processors, the program instructions comprising:

program instructions to select one of a plurality of inputs to a multiplexor with a first multiplexor select value at a first clock, wherein each input to the multiplexor is identified as one of i) valid and ii) invalid and the first multiplexor select value is latched in a latch until the first multiplexor select value is replaced by a second multiplexor select value;

program instructions to determine the second multiplexor select value;

program instructions to compare the second multiplexor select value and the first multiplexor select value;

in response to the second multiplexor select value being the same as the first multiplexor select value, program instructions to maintain the first multiplexor select value at a second clock, wherein (i) the multiplexor does not change the selection from the plurality of inputs and (ii) the second clock occurs after the first clock;

in response to (a) the second multiplexor select value is different from the first multiplexor select value and (b) the second multiplexor select value selects a valid input, program instructions to apply the second multiplexor select value to the multiplexor at the second clock, wherein the second clock occurs after the first clock; and program instructions to, subsequent to applying the second multiplexor select value, latch the second multiplexor value in the latch.

16. The computer system product of claim 15, wherein the multiplexor is a part of an instruction issue unit in a processor.

17. The computer system product of claim 16, wherein the plurality of inputs to the multiplexor are instruction source operands.

18. The computer system product of claim 16, wherein the instruction issue unit can select one of up to eight instructions to issue.

19. The computer system product of claim 18, wherein an instruction can have up to three source operands.

20. The computer system product of claim 19, wherein the instruction table identifies one or more entries in the instruction table that each contain an instruction that is ready to execute.

* * * * *